Sept. 3, 1968  J. D. BARR ET AL  3,399,943
CONTROL DEVICES FOR OPTICAL OBJECTIVES OF VARIABLE
EQUIVALENT FOCAL LENGTH
Filed Jan. 16, 1964  4 Sheets-Sheet 1

Inventors
JOHN D. BARR
DEXTER R. PLUMMER
By
Holcombe, Wetherill + Brisebois
Attorneys Inventors
JOHN D. BARR
DEXTER R. PLUMMER
By
Holcombe, Wasall + Brysebois
Attorneys Inventors
JOHN D. BARR
DEXTER R. PLUMMER Sept. 3, 1968    J. D. BARR ET AL    3,399,943
CONTROL DEVICES FOR OPTICAL OBJECTIVES OF VARIABLE
EQUIVALENT FOCAL LENGTH
Filed Jan. 16, 1964    4 Sheets-Sheet 4
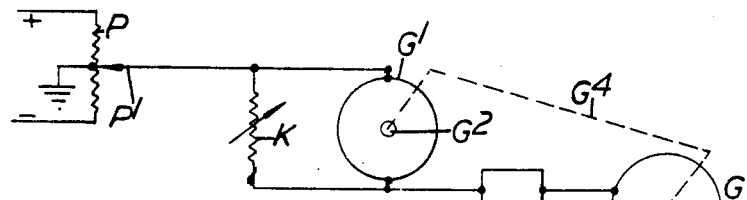
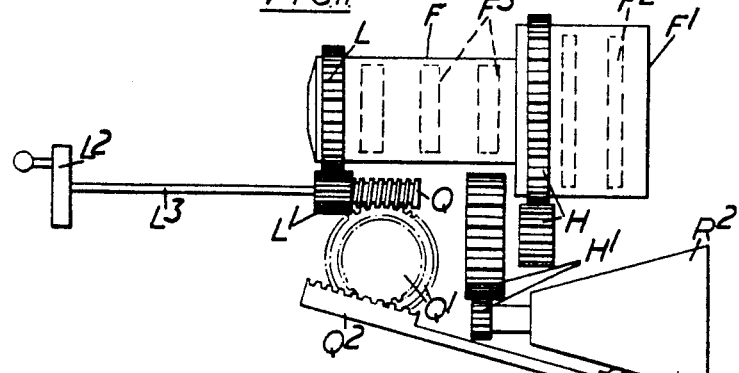
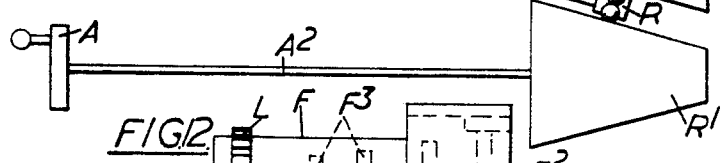
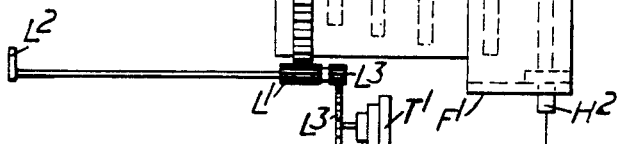
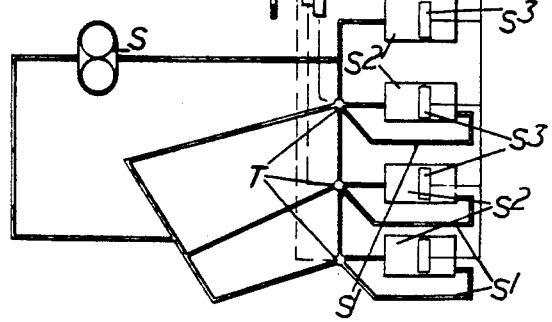
Inventors
JOHN D. BARR
DEXTER R. PLUMMER
By
Holcombe, Wetherill & Brisebois
Attorneys United States Patent Office 3,399,943
Patented Sept. 3, 1968

3,399,943
CONTROL DEVICES FOR OPTICAL OBJECTIVES OF VARIABLE EQUIVALENT FOCAL LENGTH
John D. Barr, Oadby, and Dexter R. Plummer, Leicester, England, assignors to Rank Precision Industries Limited, trading as The Rank Organisation Rank Taylor Hobson Division, Leicester, England, a British company
Filed Jan. 16, 1964, Ser. No. 338,147
Claims priority, application Great Britain, Jan. 18, 1963, 2,281/63
10 Claims. (Cl. 350—187)

ABSTRACT OF THE DISCLOSURE

A control device for an objective of the zoom type in which the zoom control element also acts to vary the effective transmission ratio of the transmission between the focussing control element and the movable part of the objective controlled thereby. In a preferred embodiment the transmission is electrical and the output of a generator driven by the focussing control element forms part of the input which drives a motor which drives the movable part of the objective. A voltage proportional to the movement of the motor is fed back as the remainder of said input in opposition to the output of the generator, and the zoom control element is connected to regulate this feedback voltage, thus regulating the net input to the motor.

---

Figure 1:
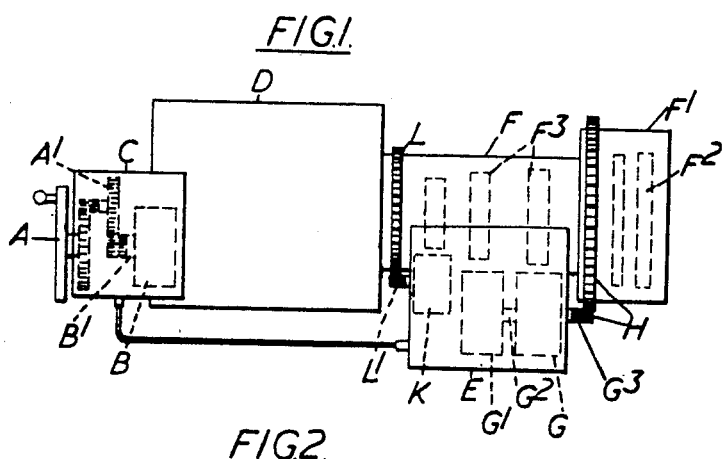

This invention relates to a control device for an optical objective of the kind having members relatively movable under the control of a zoom control element for effecting continuous variation of the equivalent focal length of the objective throughout a range whilst maintaining constant the position of the image plane, and also having part of the objective movable under the control of a focussing control element to suit different object distances.

The optical objective of this kind usually consists of a front assembly including the members relatively movable for zooming purposes, and a rear assembly which remains stationary during the zooming relative movements. The part of the objective movable for focussing usually consists of a part, for example the front member or a part of such front member, of the front assembly.

In such an objective, the depth of focus varies appreciably with variation in the equivalent focal length. For example, in an objective having a maximum equivalent focal length ten times that of the minimum equivalent focal length, the depth of focus at minimum equivalent focal length may be about one hundred times that at maximum equivalent focal length. This is disadvantageous in that the independent focussing control is only of appropriate sensitivity, even within fairly wide acceptable limits, for one portion of the range of variation of equivalent focal length.

The object of the present invention is to provide a control device for an optical objective of variable equivalent focal length wherein the above-described disadvantage may be substantially avoided.

In the control device according to the present invention, means are provided whereby movement of the zoom control element also acts to vary an effective transmission ratio in the transmission between the focussing control element and the movable part of the objective controlled thereby. For rendering the focussing control of appropriate sensitivity throughout the range of zoom, the adjustment means is conveniently arranged to act in such a manner that, for a given operation of the focussing control element, the movement of the part of the objective movable for focussing progressively increases towards the end of the range of zoom corresponding to the smallest equivalent focal length, and vice versa.

With this arrangement, the apparent sensitivity of the focussing control may be maintained substantially constant throughout the range of variation of equivalent focal length if desired, but this will only rarely be necessary, and the arrangement will usually only be such as to maintain the sensitivity within the fairly wide acceptable limits throughout the range of variation of equivalent focal length. However, it should be made clear that the adjustment means may act to vary the said transmission ratio either continuously or in steps, and the term "progressively" is to be interpreted accordingly.

It will be realised that the described arrangement does not permit provision of a simple directly marked focussing scale, on or adjacent to the focussing control element, for the position of such element is not predeterminable since its movement for focussing purposes depends on the setting of the zoom control element. However, although a focussing scale linked with the actual position of the part of the objective movable for focussing purposes may be provided, in practice it is to be appreciated that the operator, using a camera fitted with an objective of variable equivalent focal length, invariably utilises a monitor screen or analogous sighting screen in effecting adjustments of the objective, so that the provision of a focussing scale is usually rendered unnecessary.

The transmission from the focussing control element to the part of the objective driven thereby is effected in one arrangement through means responsive to the speed of movement of the focussing control element and acting in conjunction with the zoom control element to control the speed of movement of the driven part. For example such transmission may be electrical and such means may be constituted by a tachogenerator. In this connection, it should be mentioned that a tachogenerator is a generator which, over a wide speed range from zero up to several thousand revolutions per minute, gives an electrical output voltage approximately proportional to its speed.

In an alternative arrangement however, the transmission from the focussing control element to the part of the objective controlled thereby is effected through means responsive to the position of the focussing control element and acting in conjunction with the zoom control element to control the speed of movement of the driven part. For example, when the transmission is electrical, such means may be constituted by a potentiometer giving an electrical output voltage substantially proportional to its position of adjustment, the movable contact of such potentiometer being urged towards a normal zero position in which the output voltage is zero. In this alternative arrangement, it will be realised that since the position of the focussing control element determines the speed of the driven part of the objective, the actual positional movement of this part of the objective also depends on the time period for which the control element is maintained in the operative position.

In either of the above-mentioned arrangements, the speed of movement of the driven part of the objective is preferably determined by a device responsive to the output voltage of the tachogenerator or potentiometer under the control of the zoom control element. For example, such device may be constituted by a servo-device comprising a reversible electric motor which drives the driven part of the objective, and a second tachogenerator which is driven by the motor and whose voltage output cooperates with that of the first tachogenerator or the potentiometer in controlling the speed of the motor. Alternatively, the said device may comprise a reversible electric motor which drives the driven part of the objective, one or more controlling input voltages, which are amplified and applied to the motor to control the speed thereof, being derived from the output voltage of the tachogenerator or potentiometer and a voltage taken from a feed-back circuit connected with the motor winding or one of the motor windings.

When the above-mentioned servo-device is employed, the motor may again have applied to it either one or more controlling input voltages, these being derived from the two output voltages, either of the two tachogenerators or of the potentiometer and second tachogenerator, through a circuit incorporating a potentiometer actuated by the zoom control element, and being amplified. In a preferred arrangement, a single controlling input voltage for the motor is employed, this voltage being constituted by the difference between two voltages, one of which is constituted by one of the said two output voltages, whilst the other is derived through the zoom-actuated potentiometer from the other output voltage.

It may be mentioned in connection with the above-described arrangements utilising speed controlling devices, that it is because such devices are speed controlling rather than position controlling that variation of the transmission between the focussing control element and the part of the objective controlled thereby can readily be effected by movement of the zoom control element without affecting the focussing control when the focussing control element is stationary. However, whether such speed controlling devices are employed or not, the sensitivity of the focussing control may alternatively be determined by means of a variable speed gearing, interposed in the transmission between the focussing control element and the part of the objective controlled thereby, and adjustable by the zoom control element.

Further features of the invention will be apparent from the practical arrangements of control device, for an optical objective of variable equivalent focal length, now to be described by way of example with reference to the accompanying drawings. The optical objective will be assumed to form part of a camera, for example a television camera, having the objective at its front and the objective controls at its rear, with an adjacent monitor screen for use by the operator.

Figure 2:
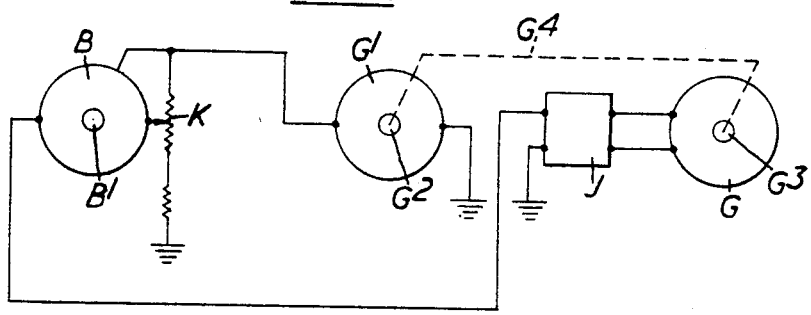
Figure 3:
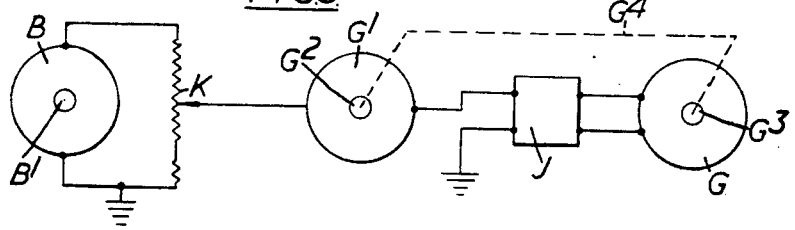
Figure 4:
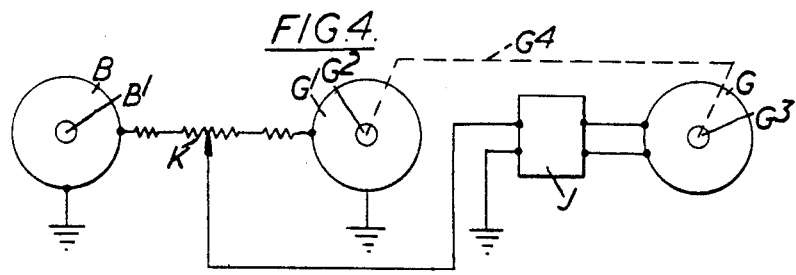
Figure 6:
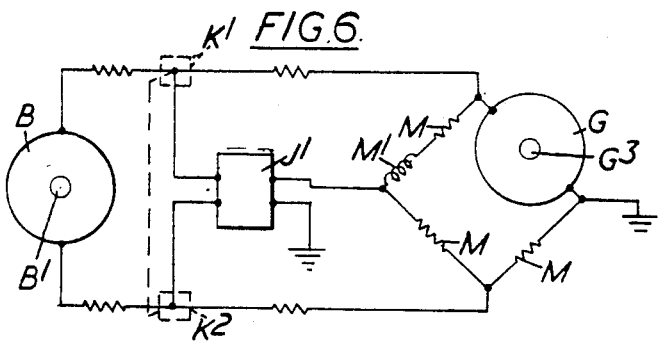
Figure 5:
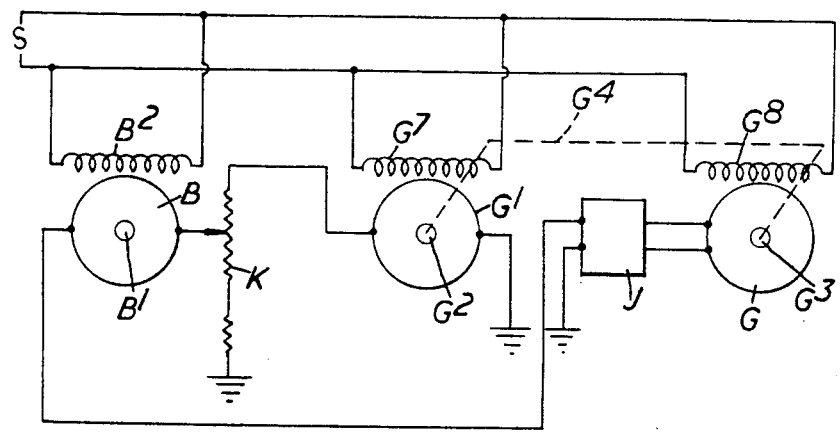
Figure 7:
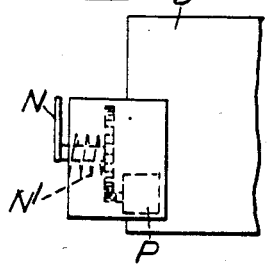

In the drawings,

FIGURE 1 shows in diagrammatic form, the television camera with an electrical control device mounted thereon, FIGURES 2 to 4 respectively show details of three different preferred practical arrangements of the control device of FIGURE 1 each incorporating a servo-device responsive to the speed of movement of the focus demand element, and operating on a direct current basis, FIGURE 5 shows a modification of the arrangement of FIGURE 2 operating on an alternating current basis, FIGURE 6 shows a further practical arrangement wherein the servo-device is replaced by an equivalent feedback device, FIGURE 7 shows a modification to the television camera of FIGURE 1, FIGURES 8 to 10 respectively show details of three further practical arrangements of control device in accordance with the modification of FIGURE 6, each incorporating a servo-device responsive to the position of the focus demand element, FIGURE 11 shows a purely mechanical arrangement of control device, and FIGURE 12 shows yet a further arrangement of control device operated partly hydraulically.

In the arrangement of FIGURE 1, the focussing control element is in the form of a hand wheel A which is coupled through gearing $A^1$ to the input shaft $B^1$ of a tachogenerator B to drive such tachogenerator at a considerably faster speed than the speed of the hand wheel. This tachogenerator B and the associated gearing may conveniently be accommodated in a small housing C on the side of the camera D at its rear end. The gearing $A^1$ may of course be arranged in various ways other than that shown and may if desired be replaced by a friction drive.

The output of the tachogenerator B, which is proportional in sense and magnitude to the sense and speed of movement of the hand wheel A, is fed to an electrical servo-device contained in a small housing E on the side of the objective housing F at the front of the camera D. In FIGURE 1, the sizes of the housings C and E are considerably exaggerated for clarity, since in practice these housings and the parts within them may be quite small. The servo-device comprises a reversible electric motor G and a second tachogenerator $G^1$ having an input shaft $G^2$ rigid with the output shaft $G^3$ of the motor, the motor output being taken from this shaft through reduction gearing H so as to drive the part of the objective movable to effect focussing. In a preferred arrangement, this movable part of the objective is constituted by a part $F^2$ of the front member of the front assembly of the objective only, accommodated within the enlarged front part $F^1$ of the objective housing F, and is movable by means of a simple helical drive requiring relatively low torque. This enables a relatively low power drive to be employed, so that an electric motor of small size may be employed, together with quiet gearing.

The servo-device also includes a high gain multi-stage amplifier J (see FIGURE 2), to which is applied not only the output voltage of the first tachogenerator B driven by the hand wheel A, but also a voltage derived from the output voltage of the second tachogenerator $G^1$ driven by the motor G. As also shown in FIGURE 2, the output of the second tachogenerator $G^1$ is fed back to the amplifier J, in opposition to the input voltage due to the first tachogenerator B, through a potentiometer K controlled by the zoom control element (not shown), either through a direct mechanical linkage or through a linkage via the zoom control mechanism. Thus, the second input voltage to the amplifier J is constituted by the output voltage of the second tachogenerator $G^1$ attenuated by the potentiometer K, the degree of attenuation depending on the position of the zoom control element and thus on the equivalent focal length of the objective. In FIGURE 1, the gear driving the parts $F^3$ of the objective movable for zooming is shown at L, with a gear coupling $L^1$ between this driving gear and the potentiometer K. The gear L may be driven from the zoom control element in a variety of ways, but conveniently a servo-device may be employed for this purpose also, as will be later referred to in connection with FIGURES 8 to 10.

The operation of the above-described servo-device may best be understood by first considering focus control while the zoom control L, $L^1$ is held fixed, whereby the attenuation afforded by the potentiometer K remains constant, so that the input to the amplifier J due to the second tachogenerator $G^1$ is dependent only on the speed of the motor G and thus on the speed of movement of the movable part $F^2$ of the objective. The arrangement, in this circumstance, constitutes a speed controlling servo-device in which the speed of the driven member $F^2$ is proportional to the speed of the hand wheel A, and the change in position of the movable part of the objective proportionately corresponds to the change in position of the hand wheel. In contrast with a position-controlling servo-device however, there is substantially no time lag in the response of the movable part $F^2$ of the objective to stopping of the hand wheel A, the movable part of the objective stopping substantially simultaneously with stopping of the hand wheel. This feature, which is effective whatever the setting of the potentiometer K, is advantageous when the operator is working by use of a monitor screen. On the other hand, even with potentiometer setting constant, it will be realised that the positional relationship between the movable part $F^2$ of the objective and the hand wheel A is less exact than in the case of a position servo-device, since any error in such relationship, for example due to saturation of the servo-device, is not made up after the hand wheel is stopped. Thus, when the hand wheel A is stopped, a large reversing voltage is at once applied to the motor G from the second tachogenerator $G^2$, whereby the motor stops substantially immediately.

The potentiometer is driven from the zoom control element through the gearing L, $L^1$ so that, at maximum equivalent focal length, the output voltage of the second tachogenerator $G^1$ has maximum effect, and progressively at reduced equivalent focal lengths, increasingly less effect. This has the result that, for a given rate of rotation of the hand wheel A, only a small movement of the movable part $F^2$ of the objective occurs at maximum equivalent focal length and such movement increases progressively towards the end of the range of zoom corresponding to minimum equivalent focal length. With an objective having a ratio of maximum equivalent focal length to minimum equivalent focal length of say ten, the corresponding ratio in depths of focus between the two ends of the scale is about a hundred, but since variation in the apparent sensitivity of the focus control is acceptable within fairly wide limits, the potentiometer will usually be arranged only partly to offset the change in depth of focus, so as to maintain sensitivity within such acceptable limits.

The presence of the potentiometer K in the feed back circuit of the servo-device means that there is no predeterminable relationship between the position of the movable part $F^2$ of the objective and the position of the hand wheel A, since the movement of the hand wheel to effect focussing at any particular time is dependent on the position of the zoom control element. However, this is not disadvantageous since, when the operator is working from a monitor screen, it is not usually necessary to provide any focussing scale for the hand wheel. Nevertheless, it should be made clear that, apart from the other advantages thereof, it is the use of a speed controlling servo-device, rather than a position controlling servo-device, which makes practicable the use of the above-described potentiometer K for sensitivity adjustment. With a position controlling servo-device, it is impracticable to effect sensitivity adjustment by means of such a potentiometer, without causing undesired movement of the movable part $F^2$ of the objective. It is to be noted that, in the above-described arrangement, movement of the zoom control element does not affect the focus setting, which is adjusted solely by movement of the focussing control hand wheel A.

It will be clear that the above-described potentiometer K may alternatively be used to vary the proportion of the input voltage of the first tachogenerator B which is applied to the amplifier J, as shown in FIGURE 3, in which case the potentiometer affords maximum attenuation at maximum equivalent focal length, or yet again be used as a potential divider acting to vary the attenuation in inverse proportions, of the output voltages of the tachogenerators B and $G^1$, as shown in FIGURE 4. It is also practical to incorporate such potentiometer as part of a push-pull circuit in the amplifier. Furthermore, such potentiometer may be replaced by a variable reactance device in an alternating-current system. By way of example, FIGURE 5 illustrates an alternating-current system generally analogous to the arrangement of FIGURE 2. Control windings for the tachogenerators B and $G^1$ and the motor G are shown at $B^2$, $G^7$ and $G^8$ respectively, connected across a common alternating current source. The arrangements of FIGURES 3 to 5 will be clear without further description, and in these figures the same reference letters are used as in FIGURE 2 for corresponding parts. In each of FIGURES 2 to 5 and in further figures, the broken line $G^4$ serves to indicate that the output shaft $G^3$ of the motor G is rigid with the input shaft $G^2$ to the tachogenerator $G^1$.

In an alternative arrangement of control device operating on a direct-current basis and shown in FIGURE 6, the above-described servo-device is replaced by an analogous device comprising a reversible direct-current electric motor G, connected in one arm of a bridge circuit also comprising resistances M and a compensating inductance $M^1$ for the motor. An amplifier $J^1$ has two inputs, respectively positive and negative, to which are applied positive and negative outputs from the first tachogenerator B and negative and positive feed-backs from two opposite corners of the bridge circuit G, M and $M^1$. The output of the amplifier $J^1$ is taken to a third corner of the bridge circuit, the fourth corner being earthed. With this arrangement, the feed-back to the amplifier $J^1$ is representative of the back electro-motive-force of the motor G, which is dependent on the speed thereof. The potentiometer for sensitivity adjustment is incorporated, for example as shown by the broken lines, to act as a potential divider between the output voltage of the tachogenerator B and the feed-back voltage of the bridge circuit G, M and $M^1$. This potentiometer is formed in two parts $K^1$, $K^2$ in view of the two inputs to the amplifier $J^1$. With this arrangement, the voltage applied to the motor, for a fixed position of the potentiometer $K^1$, $K^2$, is as before proportional to the difference between two voltages proportional to the speeds of the focussing control hand wheel A and the movable part $F^2$ of the objective, so that the arrangement in effect constitutes a speed responsive device acting in the same manner as the servo-device in the arrangement previously described.

The arrangement last described with reference to FIGURE 6 is illustrative of a number of ways in which a feed-back circuit may be employed to cause a correcting voltage to be applied to the motor G, without requiring the use of a second tachogenerator. Moreover, if desired, instead of a single controlling input voltage for the motor, derived from the output voltage of the first tachogenerator and from the feedback voltage, the last two-mentioned voltages may be amplified and utilised to provide two separate controlling currents for a motor, for example of the substantially constant armature current type, having two control field windings. In this instance the two currents are compared in the motor and a correcting torque is applied at the output shaft. In this arrangement, as in other arrangements, the potentiometer constituting the sensitivity adjustment means is connected in the circuit of either controlling input voltage.

Figure 8:
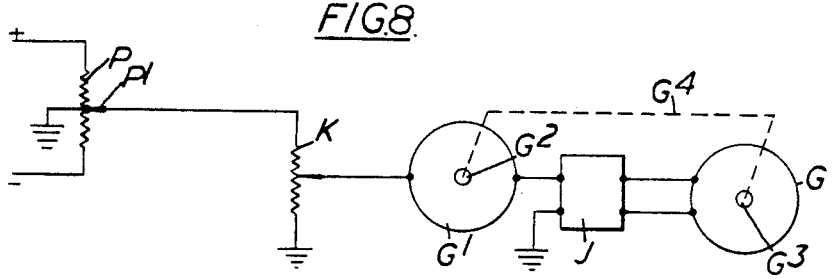
Figure 9:
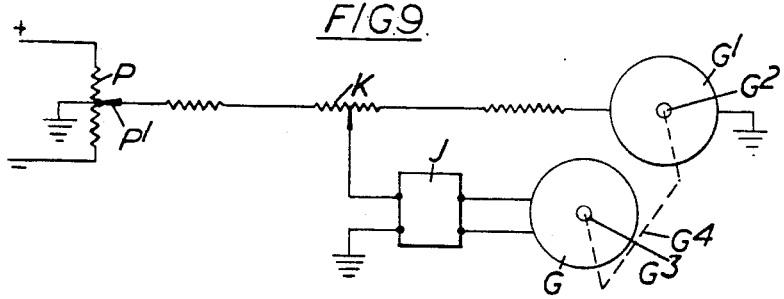

In a further arrangement of control device, the hand wheel focus control is replaced at the rear of the camera D (see FIGURE 7) by a hand lever N displaceable on either side of a normal zero position into which such lever is urged by means of a spring $N^1$, and the first tachogenerator driven by the former hand wheel is replaced, as shown in FIGURE 8, by a potentiometer P having a movable output contact $P^1$. This movable contact $P^1$ is linked with the hand lever N. The potentiometer P is fed from a suitable alternating-current or direct-current source and has an earthed central point, so that its output depends in sense and magnitude on the position of its movable contact, such output being zero in the zero position of the hand lever N, since the movable contact then lies at the earthed central point. The output voltage of the potentiometer P is fed to means controlling the speed and direction of movement of the movable part of the objective in accordance with such voltage, for example the previously described speed-controlling servo-device. Sensitivity control means, in the form of a potentiometer (or variable reactance if preferred in the case of an alternating-current system) controlled by the zoom control element, is incorporated in one or other of the ways previously mentioned. FIGURES 8, 9 and 10 respectively show three alternative ways of incorporating the potentiometer K. In each of these arrangements, the part of the objective movable for focussing is driven by a servo-device similar to that described with reference to previous figures, and the same reference letters are used to indicate corresponding parts. With each of these alternative arrangements, the speed of movement of the part $F^2$ of the objective movable for focussing purposes depends on the position to which the hand lever N is moved from its zero position, and the actual change of position of such movable objective part depends, not only on the position to which the hand lever is moved, but also on the time period for which such lever is maintained in such position. The movement of the movable part $F^2$ of the objective stops substantially simultaneously with the release of the hand lever N and its automatic return to the zero position.

The above-described arrangements are similar to one another in that transmission between the focussing control element A or N and the movable part $F^2$ of the objective controlled thereby is effected by means of speed controlling devices electrically energized, and the sensitivity control device is constituted by a variable electrical resistance K (or reactance if preferred in an alternating-current system).

Another arrangement of control device utilises adjustment means in the focussing transmission in the form of a variable speed gear, for example of the well known ball and disc kind. The drive to the movable part of the objective from the focussing control element may be effected in this instance either by the transmission arrangements previously described, with the potentiometer removed, or alternatively by a position-controlling transmission mechanism, the variable speed gear preferably being interposed in such drive between the output shaft and the movable part of the objective. One convenient arrangement of position-controlling transmission mechanism for use in such instance utilises a potentiometer driven by the focussing control hand wheel or lever, and a servo-mechanism providing a feed-back or correcting voltage dependent, not on the speed of movement but on the position of the movable part of the objective. Such position-controlling servo-devices are well known and this modified arrangement will therefore be clear without illustration.

FIGURE 11 shows an arrangement wherein the adjustment means is in the form of a variable speed gear, the arrangement also employing purely mechanical transmissions between the focussing control hand wheel A and the part $F^2$ of the objective movable for focussing and between the zoom control element $L^2$ and the parts $F^3$ of the objective movable for zooming. In this arrangement, the zoom control $L^2$ drives the zoom gearing L, $L^1$ directly through a rotary transmission shaft or cable $L^3$, and also acts to operate a worm Q driving gears $Q^1$ which in turn cause sliding movement of an inclined rack element $Q^2$. The rack element $Q^2$ carries the intermediate part R of a variable speed gear of the well known type having two oppositely directed rotatable cones $R^1$, $R^2$ disposed side by side, so that the effective transmission ratio between the two cones $R^1$ and $R^2$ is dependent on the position of the intermediate part R slidable between them. The driving cone $R^1$ is driven directly by the focussing hand wheel A through a rotary transmission shaft or cable $A^2$, while the driven cone $R^2$ drives the zoom gearing H through intermediate gearing $H^1$. With this arrangement, the sensitivity of the focus control is dependent on the position of the zoom control, and thus on the equivalent focal length of the objective as varied by zooming. The variable speed gearing is arranged to act to render the apparent sensitivity of the focus control approximately constant as the equivalent focal length of the objective is altered, the increased depth of field at smaller equivalent focal lengths being compensated for by the larger movement of the movable part of the objective which takes place for a given movement of the focus control.

In a still further arrangement of control device hydraulic transmission is employed, and the sensitivity adjustment means comprises a swash plate the angle of which can be varied in the well known manner. The swash plate is mechanically linked with the zoom control element to effect variation in the sensitivity of the focussing control in accordance with the variation in the equivalent focal length of the objective.

An alternative arrangement employing hydraulic transmission is indicated diagrammatically in FIGURE 12, and serves also to indicate an arrangement wherein the adjustment means associated with the focussing transmission operates in steps instead of continuously, as for example if the potentiometer of the arrangements previously described were replaced by a device for switching resistances. In the arrangement of FIGURE 12, a pump S is operable under the control of the focussing control element (not shown) itself to operate the pistons of a number of cylinders and pistons $S^2$, $S^3$, the cylinders $S^2$ being hydraulically connected in parallel and the pistons $S^3$ being mechanically linked to move together. Each cylinder $S^2$, except the first, has a by-pass passage $S^1$ connecting its inlet with the remote end of the cylinder on the side of the piston $S^3$ remote from the inlet. The piston assembly is mechanically linked with a member $H^2$ driving the part $F^2$ of the objective movable for focussing. The effective transmission ratio of this system is varied by cutting out of operation one or more of the cylinders $S^2$. Thus, the inlet to each cylinder $S^2$ (except the first) incorporates a switch-over valve T which is operated under the control of the zoom control element $L^2$. For this purpose, the zoom gearing L, $L^1$ drives intermediate gearing $L^3$ for a cam $T^1$ which is mechanically linked with each of the shut-off valves T so that, during zooming, such cam $T^1$ acts to operate the valves T one after another. Each valve T has two positions, in one of which its associated cylinder and piston $S^2$ and $S^3$ is rendered operative and in the other of which such cylinder and piston are rendered inoperative. In the first of such positions, the valve T connects the cylinder inlet to the pump S and the by-pass passage $S^1$ to the return pipe, whilst in the second of such positions, the valve blocks the pump flow and return and renders the cylinder $S^2$ inoperative by connecting its two ends together by means of the bypass passage. In use of this arrangement, during zooming from a small equivalent focal length to a large equivalent focal length, the cam T driven by the zoom control $L^2$ acts to operate the valves $T^1$ one after another so as to render inoperative an increasing number of the cylinders $S^2$, thereby to maintain the focus control of appropriate apparent sensitivity within the fairly wide limits acceptable.

What we claim as our invention and desire to secure by Letters Patent is:

1. A control device for an optical objective of the kind having a zoom control element, members relatively movable under the control of said zoom control element for effecting continuous variation of the equivalent focal length of the objective throughout a range while maintaining constant the position of the image plane, and a focussing control element, a part of said objective being movable under the control of said focussing control element to suit different object distances; said control device comprising drive means for moving said movable part, output means giving a first output dependent on the movement of the focussing control element, transmission means which supplies to said drive means an input derived from said output to effect movement of the said part of the objective movable for focussing purposes; second output means supplying to said transmission means a second output derived from the movement of said movable part of the objective, and means actuated by said zoom control element for automatically regulating the ratio between said first output and the input supplied to said drive means by said transmission means to maintain the apparent sensitivity of adjustment of said focussing control element within acceptable limits throughout said range by regulating the output supplied by said second output means to said transmission means.

2. A control device as claimed in claim 1, in which the means giving an output dependent on the movement of the focussing control element is a tachogenerator giving an electrical output voltage approximately proportional to the speed of movement of the focussing control element.

3. A control device as claimed in claim 1, in which the means giving an output dependent on the movement of the focussing control element comprises a potentiometer having a movable contact actuated by the focussing control element and thereby giving an electrical output voltage dependent on the position of the focussing control element.

4. A control device for an optical objective of the kind having a zoom control element, members relatively movable under the control of said zoom control element for effecting continuous variation of the equivalent focal length of the objective throughout a range while maintaining constant the position of the image plane, and a focussing control element, a part of said objective being movable under the control of said focussing control element to suit different object distances, said control device comprising means controlled by the focussing control element for giving an electrical output voltage dependent on the movement of such element, a reversible electric motor for driving the part of the objective movable for focussing purposes, means for giving a feedback voltage dependent on the speed of movement of the said movable part of the objective, an electrical transmission circuit energized from the said output voltage and said feed-back voltage for energizing the reversible electric motor, and means actuated by said zoom control element for varying the transmission ratio of said transmission circuit to maintain the apparent sensitivity of adjustment of said focussing control within acceptable limits throughout said zooming range by regulating the feed-back voltage supplied to said transmission circuit.

5. A control device as claimed in claim 6, in which said means for giving the feed-back voltage includes a tachogenerator driven by the reversible motor at a speed proportional to the speed of movement of the part of the objective movable for focussing purposes, said transmission ratio varying means comprising a potentiometer connected across such tachogenerator, and means whereby the feed-back voltage is fed through the movable contact of such potentiometer to the said electrical circuit in series with the said output voltage controlled by the focussing control element.

6. A control device as claimed in claim 5, in which the means for giving the output voltage dependent on the movement of the focussing control element is a tachogenerator driven at a speed proportional to the speed of operation of the focussing control element.

7. A control device as claimed in claim 5, in which the means for giving the output voltage dependent on the movement of the focussing control element comprises a potentiometer having a movable contact actuated by the focussing control element and thereby giving an output voltage dependent on the position of such element, and means for urging such movable contact towards a normal zero position in which the output voltage of the said potentiometer is zero.

8. A control device as claimed in claim 4, in which the said transmission ratio varying means comprises a potentiometer arranged as a voltage divider in the said electrical circuit for varying the relative proportions in which the said output voltage and the feed-back voltage are combined together for the energization of the reversible motor.

9. A control device as claimed in claim 8, in which the means for giving the output voltage dependent on the movement of the focussing control element is a tachogenerator driven at a speed proportional to the speed of operation of the focussing control element.

10. A control device as claimed in claim 8, in which the means for giving the output voltage dependent on the movement of the focussing control element comprises a potentiometer having a movable contact actuated by the focussing control element and thereby giving an output voltage dependent on the position of such element, and means for urging such movable contact towards a normal zero position in which the output voltage of the said potentiometer is zero.

References Cited

UNITED STATES PATENTS

| | | | |
|---|---|---|---|
| 1,128,460 | 2/1915 | Kubitz et al. | 74—193 X |
| 3,118,354 | 1/1964 | O'Brien | 88—57 |
| 3,283,231 | 11/1966 | Askew | 88—57 X |

DAVID H. RUBIN, Primary Examiner.

R. J. STERN, Assistant Examiner.